unitedstates Patent Office 3,475,429
Patented Oct. 28, 1969

3,475,429
THIENO[3,2-d]PYRIMIDINES AND SALTS THEREOF
Eberhard Woitun and Gerhard Ohnacker, Biberach an der Riss, Germany, assignors to Boehringer Ingelheim G.m.b.H., Ingelheim am Rhein, Germany, a corporation of Germany
No Drawing. Continuation-in-part of application Ser. No. 425,342, Jan. 13, 1965. This application May 28, 1968, Ser. No. 732,513
Claims priority, application Germany, Jan. 15, 1964, T 25,430
Int. Cl. C07d 95/00; A61k 27/00
U.S. Cl. 260—247.1                                6 Claims

ABSTRACT OF THE DISCLOSURE

The compounds are 2,4 - disubstituted - theino[3,2-d] pyrimidines and acid addition salts thereof, useful as coronary and peripheral blood vessel dilators and sedatives in warm-blooded animals and as inhibitors of the aggregation of platelets in blood plasma of warm-blooded animals.

---

This is a continuation-in-part of copending application Ser. No. 425,342, filed Jan. 13, 1965, now abandoned.

This invention relates to novel thieno[3,2-d]pyrimidines, as well as to acid addition salts thereof.

More particularly, the present invention relates to novel substitution products of thieno[3,2-d]pyrimidines of the formula

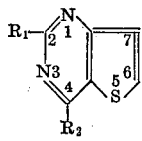

(I)

wherein $R_1$ and $R_2$, which may be identical to or different from each other, are lower alkoxy, amino, lower alkyl-amino, allylamino, hydroxy-lower alkyl-amino, di-lower alkyl-amino, di-(hydroxy-lower alkyl)-amino, (lower alkyl)-(hydroxy-lower alkyl)-amino, pyrrolidino, piperidino, morpholino, methylmorpholino or N-methyl-piperazino, and non-toxic, pharmacologically acceptable acid addition salts thereof.

The novel compounds according to the present invention may be prepared by the following method.

Reaction of a thieno[3,2-d]pyrimidine of the formula

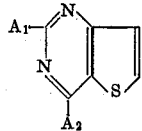

(II)

wherein one of substituents $A_1$ and $A_2$ is halogen, mercapto or lower alkyl-mercapto and the other is halogen, mercapto, lower alkyl-mercapto or one of the other substituent radicals included in the definition of $R_1$ and $R_2$ in connection with Formula I, with compounds of the formulas

$R_1H$ (III)

and

$R_2H$ (IV)

wherein $R_1$ and $R_2$ have the same meanings as in Formula I.

If this method is to be used to prepare a compound of the Formula I wherein $R_1$ and $R_2$ are identical substituents, the starting compound of the Formula II should be one wherein both $A_1$ and $A_2$ are halogen, mercapto or lower alkylmercapto; the starting compound is reacted with two or more molar equivalents of either Compound III or IV. On the other hand, if it is desired to prepare a compound of the Formula I wherein $R_1$ and $R_2$ are different from each other, this result may be accomplished either by reacting a thieno[3,2-d]pyrimidine of the Formula II first with one molar equivalent of Compound IV and then with one molar equivalent of Compound III, or by reacting a thieno[3,2-d]pyrimidine of the Formula II wherein one of substiutents $A_1$ and $A_2$ already has one of the meanings defined for $R_1$ and $R_2$, respectively, with one molar equivalent of Compound III or Compound IV.

The reaction of this method is advantageously carried out in the presence of an inert organic solvent at a temperature between 0 and 200° C.; in the event that either or both of substituents $A_1$ and $A_2$ are halogen, the presence of a compound capable of tying up or neutralizing the hydrogen halide released by the reaction is required. Examples of suitable such compounds are inorganic bases or tertiary organic bases. In the event that either or both of substituents $R_1$ and $R_2$ of the reaction product are to be identical amino groups, an excess of the amine $R_1H$ or $R_2H$ may also be used as the hydrogen halide-binding agent. A still greater excess of this amine may also serve as a solvent medium for the reaction.

The optimum reaction temperature depends upon the reactivity of the reactants. In general, the exchange of a halogen atom in the 4-position of starting Compound II for one of the radicals defined for $R_1$ in the presence of a hydrogen halide-binding agent proceeds already at room temperature or moderately elevated temperatures. On the other hand, the exchange of a halogen atom in the 2-position or of a mercapto group in the 2- or 4-position of Compound II for an amino-substituent requires a temperature between 70 and 200° C. If a solvent having a low boiling point is used or if the reactant $R_1H$ or $R_2H$ has a low boiling point, the reaction is advantageously carried out in a closed vessel.

If it is desired to prepare compounds of the Formula I wherein either or both of substituents $R_1$ and $R_2$ are substituted hydroxyl groups, it is advantageously to start with a thieno[3,2-d]pyrimidine of the Formula II wherein either or both of the substituents $A_1$ and $A_2$ are halogen.

The thieno[3,2-d]pyrimidines of the Formula II which are used as starting compounds in the above method may themselves be prepared by reacting a 3-amino-thiophene-2-carboxylic acid of the formula

(V)

or a reactive derivative thereof with free or substituted urea, thiourea or guanidine. Examples of suitable reactive derivatives of 3-aminothiophene-2-carboxylic acids of the Formula V are esters, amides or thioamides; if the reactive derivative is a thioamide, $R_2$ in the reaction product will be mercapto; in all other cases $R_2$ in the reaction product will be free hydroxyl.

For instance, compounds of the Formula II wherein the substituents $A_1$ and $A_2$ are halogen may be prepared in the following way: reaction of 3-aminothiophene-2-carboxylic ester of the Formula V with urea to give a compound of Formula I, in which both of substituents $R_1$ and $R_2$ are free hydroxyl groups and subsequent halogenating this compound with a phosphorous oxyhalide.

Compounds of the Formula II wherein the substituents $A_1$ and $A_2$ are mercapto may be prepared in the following way: reaction of the amide of 3-aminothiophene-2-thiocarboxylic acid with thiourea, or by reacting 2,4-dihydroxythieno[3,2-d]pyrimidine with phosphorus pentasulfide pursuant to known methods.

Compounds of the Formula II wherein the substituents $A_1$ and $A_2$ are alkylmercapto may be prepared by alkalating a compound of the Formula II wherein the substituents $A_1$ and $A_2$ are mercapto according to known methods, such as with an alkyl halide.

Compounds of the Formula I which comprise a basic substituent may, if desired, be transformed into their nontoxic, pharmacologically acceptable acid addition salts by known methods; that is, for example, by dissolving the free base in a suitable solvent and acidifying the resulting solution with the desired inorganic or organic acid. Examples of inorganic and organic acids which form non-toxic, pharmacologically acceptable acid addition salts with basic substituted thieno[3,2-d]pyrimidines of the present invention are hydrochloric acid, sulfuric acid, phosphoric acid, succinic acid, tartaric acid, citric acid, maleic acid, fumaric acid, 8-chlorotheophylline and the like.

The following example further illustrate the present invention and will enable others skilled in the art to understand it more completely. It should be understood, however, that the present invention is not limited to the particular examples given below.

EXAMPLES FOR THE PREPARATION OF STARTING MATERIALS

Example A.—Preparation of 2,4-dihydroxy-thieno[3,2-d]pyrimidine 1.6 gm. (0.01 mol) of 3-aminothiophene-2-carboxylic acid methyl ester and 3 gm. (0.05 mol) of urea were intimately admixed with each other, and the resulting mixture was heated at 200° C for two hours. A clear, brown melt was formed which solidified upon cooling. The solidified mass was dissolved in 1 N sodium hydroxide, the resulting solution was decolorized with charcoal and was then acidified with 2 N hydrochloric acid. A crystalline precipitate was formed, which was separated by vacuum filtration and recrystallized from water. 1.2 gm. (72% of theory) of a compound having a melting point above 300° C. were obtained. It was identified to be 2,4-hydroxy-thieno[3,2-d]pyrimidine of the formula

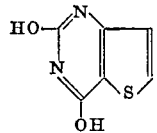

*Analysis.*—$C_6H_4N_2O_2S$; mol wt. 168.18. Calculated: C, 42.84%; H, 2.40%; N, 16.66%. Found: C, 42.75%; H, 2.57%; N, 16.82%.

The tautomer of this compound is 2,4-dioxo-1,2,3,4-tetrahydro-thieno[3,2-d]pyrimidine

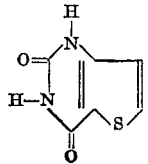

Example B.—Preparation of 2,4-dichloro-thieno[3,2-d]pyrimidine

A mixture of 8.66 g. (0.05 mol) of 2,4-dihydroxy-thieno[3,2-d]pyrimidine and 100 cc. phosphorous oxychloride was refluxed for four hours, whereby a clear solution was formed. The excess phosphorous oxychloride was evaporated in vacuo. The oily residue was decomposed in ice water and the resulting aqueous mixture was extracted with chloroform. The organic phase was washed with water until neutral and was then dried over sodium sulfate. The chloroform was then evaporated in vacuo, and the solid residue was recrystallized from benzene. 6.51 gm. (63% of theory) of a compound having a melting point of 141-142° C. were obtained.

It was identified to be 2,4-dichloro-thieno[3,2-d]pyrimidine of the formula

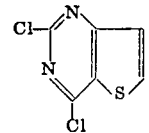

*Analysis.*—$C_6H_2Cl_2N_2S$; mol. wt. 205.13. Calculated: C, 35.10%; H, 0.97%; Cl, 34.61%. Found: C, 35.30%; H, 0.02%; Cl, 34.56%.

Example C.—Preparation of 2-chloro-4-morpholino-thieno[3,2-d]pyrimidine 5.1 gm. (0.025 mol) of 2,4-dichloro-thieno[3,2-d]pyrimidine were admixed with 200 cc of absolute ethanol. The resulting suspension was then vigorously stirred, and while stirring 4.8 gm. (0.055 mol) of morpholine were added, accompanied by cooling to maintain the mixture at 20° C. A clear solution was formed, and after a short time a crystalline substance separated out. The mixture was then stirred for two hours more at room temperature. The precipitate was thereafter separated by vacuum filtration, washed with water and ethanol, and recrystallized from methyl ethyl ketone. 5.75 gm. (90% of theory) of a compound having a melting point of 196–198° C., were obtained. It was identified to be 2-chloro-4-morpholino-thieno[3,2-d]pyrimidine of the formula

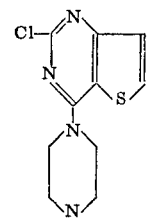

*Analysis.*—$C_{10}H_{10}ClN_3OS$; mol. wt. 255.74. Calculated: C, 46.97%; H, 3.95%; N, 16.44%. Found: C, 47.10%; H, 4.03%; N, 16.30%.

Using a procedure analogous to that described above, the following additional 2-chloro-4-amino-substituted thieno[3,2-d]pyrimidines were prepared:

(a) 2 - chloro-4-(2'-methyl-morpholino)-thieno[3,2-d]pyrimidine, M.P. 169–171° C. (recrystallized from ethanol), from 2,4-dichloro-thienol[3,2-d]pyrimidine and 2-methyl morpholine.

(b) 2-chloro - 4 - piperidino-thieno[3,2-d]pyrimidine, M.P. 130–131° C. (recrystallized from methanol), from 2,4-dichloro-thieno[3,2-d]pyrimidine and piperidine.

(c) 2-chloro - 4 - pyrrolidino-thieno[3,2-d]pyrimidine, M.P. 179–180° C. (recrystallized from ethanol), from 2,4-dichloro-thieno[3,2-d]pyrimidine and pyrrolidine.

(d) 2 - chloro-4-n-butylamino-thieno[3,2-d]pyrimidine, M.P. 94–95° C. (recrystallized from a 1:1 mixture of methanol and water), from 2,4-dichloro-thieno[3,2-d]pyrimidine and n-butylamine.

(e) 2-chloro - 4 - isopropylamino-thieno[3,2-d]pyrimidine, M.P. 140–142° C. (recrystallized from ethanol), from 2,4-dichloro-thieno[3,2-d]pyrimidine and isopropylamine.

(f) 2-chloro - 4 - dimethylamino-thieno[3,2-d]pyrimidine, M.P. 166–168° C. (recrystallized from ethanol), from 2,4-dichloro-thieno[3,2-d]pyrimidine and dimethylamine.

(g) 2-chloro - 4 - ethanolamino-thieno[3,2-d]pyrimidine, M.P. 206–207° C. (recrystallized from ethanol), from 2,4-dichloro-thieno[3,2-d]pyrimidine and ethanolamine.

(h) 2 - chloro-4-diethanolamino-thieno[3,2-d]pyrimidine, M.P. 144–145° C. (recrystallized from ethanol), from 2,4-dichloro-thieno[3,2-d]pyrimidine and diethanolamine.

(i) 2-chloro-4-(N-methyl-ethanolamino)-thieno[3,2-d] pyrimidine, M.P. 179–180° C. (recrystallized from ethanol), from 2,4-dichloro-thieno[3,2-d]pyrimidine and N-methylethanolamine.

(j) 2-chloro-4-amino-thieno[3,2-d]pyrimidine, M.P. 273–275° C. (recrystallized from ethanol), from 2,4-dichloro-thieno[3,2-d]pyrimidine and ammonia.

Example D.—Preparation of 2-chloro-4-ethoxy-thieno-[3,2-d]pyrimidine

A solution of 0.5 gm. (0.022 gm.-atoms) of sodium in 30 cc. of absolute ethanol was added to a suspension of 4.1 gm. (0.02 mol) of 2,4-dichloro-thieno[3,2-d]pyrimidine in 80 cc. of absolute ethanol, accompanied by stirring and cooling to prevent the internal temperature of the reaction mixture from rising above 25° C. A virtually clear solution was formed, from which a solid substance crystallized after a short period of standing. The reaction mixture was stirred for three hours more at room temperature and then the crystalline precipitate was separated by vacuum filtration, washed with water and ethanol, and recrystallized from ethanol. 4.1 gm. (95% of theory) of a compound having a melting point of 137–138° C. were obtained. It was identified to be 2-chloro-4-ethoxy-thieno [3,2-d]pyrimidine of the formula

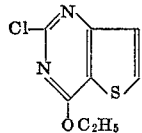

Analysis.—$C_8H_7ClN_2OS$; mol wt. 214.68. Calculated: C, 44.75%; H, 3.29%; S, 14.93%. Found. C, 44.88%; H, 3.38%; S, 14.98%.

Example E.—Preparation of 2-morpholino-4-hydroxy-thieno[3,2-d]pyrimidine

A mixture of 7.0 gm. (0.033 mol) of 2-ethylmercapto-4-hydroxy-thieno[3,2-d]pyrimidine and 50 cc. of morpholine was heated for ten hours at 160° C. in a closed vessel. Thereafter, the reaction mixture was allowed to cool, poured into water, the aqueous solution was acidified (pH 5) with glacial acetic acid, and the crystalline precipitate formed thereby was separated by vacuum filtration, washed with water and recrystallized from dimethylformamide. 6.8 gm. (87% of theory) of a white crystalline substance having a melting point of 256–258° C. were obtained. It was identified to be 2-morpholino-4-hydroxy-thieno[3,2-d]pyrimidine of the formula

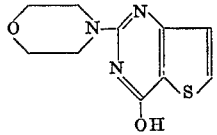

Analysis.—$C_{10}H_{11}N_3O_2S$; mol wt. 237.29. Calculated: C, 50.61%; H, 4.67%. Found: C, 50.65%; H, 4.80%.

(a) Using a procedure analogous to that described above, 2 - (N'-methyl-piperazino) - 4 - hydroxy-thieno-[3,2-d]pyrimidine, M.P. 225–226° C. (recrystallized from ethanol), was prepared from 2-ethylmercapto-4-hydroxy-thieno[3,2-d]pyrimidine and N-methyl-piperazine.

Example F.—Preparation of 2-morpholino-4-chloro-thieno[3,2-d]pyrimidine

A mixture of 2.4 gm. (0.01 mol) of 2-morpholino-4-hydroxy-thieno[3,2-d]pyrimidine and 30 cc. of phosphorus oxychloride was refluxed for two hours. A clear solution was formed. The excess phosphorus oxychloride was distilled off in vacuo, the oily residue was decomposed with ice water, and the aqueous mixture was extracted with chloroform. The extract solution was washed with water until neutral and was then evaporated to dryness, and the solid residue was recrystallized from ether. 2.0 gm. (78% of theory) of a compound having a melting point of 105° C. were obtained. It was identified to be 2-morpholino-4-chloro-thieno[3,2-d]pyrimidine of the formula

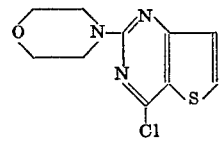

Analysis.—$C_{10}H_{10}ClN_3OS$; mol. wt. 255.74. Calculated: C, 46.97%; H, 3.94%. Found: C, 46.84%; H, 4.03%.

(a) Using a procedure analogous to that described above, 2-(N'-methyl-piperazino)-4-chloro-thieno[3,2-d] pyrimidine, M.P. 87–89° C. (recrystallized from gasoline), was prepared from 2-(N'-methyl-piperazino)-4-hydroxy-thieno[3,2-d]pyrimidine and phosphorous oxychloride.

EXAMPLES FOR THE PREPARATION OF END PRODUCTS

Example 1.—Preparation of 2,4-dimorpholino-thieno [3,2-d]pyrimidine 4.1 gm. (0.02 mol) of 2,4-dichloro-thieno[3,2-d]pyrimidine and 20 cc. of morpholine were admixed with each other at room temperature. An exothermic reaction was released and a clear solution was formed, from which a substance crystallized instantaneously. The reaction mixture was then refluxed for one hour, cooled and poured into water. The precipitate formed thereby was separated by vacuum filtration, washed with water and crystallized from ethanol. 4.3 gm. (70% of theory) of a compound having a melting point of 145–147° C. were obtained. It was identified to be 2,4-dimorpholino-thieno[3,2-d]pyrimidine of the formula

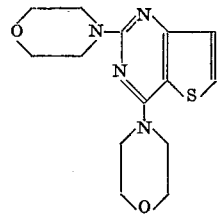

Analysis.—$C_{14}H_{18}N_4O_2S$; mol. wt. 306.39. Calculated: C, 54.88%; H, 5.92%; N, 18.29%. Found: C, 54.90%; H, 6.16%; N, 18.40%.

Using a procedure analogous to that described above, the following additional 2,4-dibasic substituted thieno [3,2-d]pyrimidines were prepared:

(a) 2,4 - di - (2' - methyl-morpholino)-thieno[3,2-d] pyrimidine, M.P. 86–87° C. (recrystallized from gasoline), from 2,4-dichloro-thieno[3,2-d]pyrimidine and 2-methyl-morpholine.

(b) 2,4 - dipyrrolidino-thieno[3,2-d]pyrimidine, M.P. 161–162° C. (recrystallized from ethanol), from 2,4-dichloro-thieno[3,2-d]pyrimidine and pyrrolidine.

(c) 2,4 - di-(ethanol-amino)-thieno[3.2-d]pyrimidine, M.P. 144–146° C. (recrystallized from methanol), from 2,4-dichloro-thieno[3,2-d]pyrimidine and ethanolamine.

(d) 2,4-diamino-thien[3,2-d]pyrimidine, M.P. 196–198° C. (recrystallized from acetone), from 2,4-dichloro-thieno[3,2-d]pyrimidine and ammonia.

(e) 2,4 - di - (n-propyl-amino)-thieno[3,2-d]pyrimidine, M.P. 76–78° C. (recrystallized from petroleum ether), from 2,4-dichloro-thieno[3,2-d]pyrimidine and n-propylamine.

(f) 2,4 - di - (isopropyl-amino)-thieno[3,2-d]pyrimidine, M.P. 87–89° C. (recrystallized from gasoline), from 2,4-dichloro-thieno[3,2-d]pyrimidine and isopropylamine.

Example 2.—Preparation of 2-diethanolamino-4-piperidino-thieno[3,2-d]pyrimidine

A mixture of 3.2 gm. (0.0125 mol.) of 2-chloro-4-piperidino-thieno[3,2-d]pyrimidine and 10 cc. of diethanolamine was heated for four hours at 150° C. Thereafter, the clear reaction solution was allowed to cool and was then poured into water. An oily substance separated out which crystallized after a short period of time. The crystalline reaction product was separated by vacuum filtration, washed with water and recrystallized from aqueous 70% methanol. 3.0 gm. (75% of theory) of a compound having a melting point of 83–84° C. were obtained. It was identified to be 2-di-ethanolamino-4-piperidino-thieno[3,2-d]pyrimidine of the formula

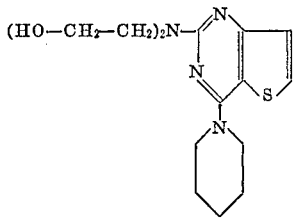

*Analysis.*—$C_{15}H_{22}N_4O_2S$; mol. wt. 322.44. Calculated: C, 55.88%; H, 6.88%; S, 9.95%. Found: C, 55.70%; H, 6.92%; S, 10.00%.

Using a procedure analogous to that described above, the following additional 2,4-dibasic-substituted thieno [3,2-d]pyrimidines were prepared.

(a) 2 - morpholino - 4-(2'-methyl-morpholino)-thieno [3,2-d]pyrimidine, M.P. 103–104° C. (recrystallized from ethanol), from 2-chloro-4-(2'-methyl-morpholino)-thieno[3,2-d]pyrimidine and morpholine.

(b) 2 - morpholino-4-pyrrolidino-thieno[3,2-d]pyrimidine, M.P. 174–176° C. (recrystallized from ethanol), from 2-chloro-4-pyrrolidino-thieno[3,2-d]pyrimidine and morpholine.

(c) 2 - morpholino-4-n-butylamino-thieno[3,2-d]pyrimidine, M.P. 118–119° C. (recrystallized from methanol), from 2-chloro-4-n-butylamino-thieno[3,2-d]pyrimidine and morpholine.

(d) 2 - morpholino - 4-isopropylamino-thieno[3,2-d]pyrimidine, M.P. 156–157° C. (recrystallized from methanol), from 2 - chloro - 4 - isopropylamino-thieno [3,2-d]pyrimidine and morpholine.

(e) 2 - morpholino - 4-dimethylamino-thieno[3,2-d]pyrimidine, M.P. 122–123° C. (recrystallized from methanol), from 2 - chloro - 4 - diethanolamino-thieno [3,2-d]pyrimidine and morpholine.

(f) 2 - morpholino - 4 - ethanolamino-thieno[3,2-d]pyrimidine, M.P. 145–147° C. (recrystallized from methanol), from 2-chloro-4-ethanolamino-thieno[3,2-d]pyrimidine and morpholine.

(g) 2 - morpholino - 4 - diethanolamino-thieno[3,2-d]pyrimidine, M.P. 130–131° C. (recrystallized from methanol), from 2 - chloro - 4 - diethanolamino-thieno [3,2-d]pyrimidine and morpholine.

(h) 2 - morpholino - 4 - (N - methyl-ethanolamino)-thieno[3,2-d]pyrimidine, M.P. 126–127° C. (recrystallized from methanol), from 2-chloro-4-(N-methyl-ethanolamino)-thieno[3,2-d]pyrimidine and morpholine.

(i) 2 - (2' - methyl-morpholino)-4-morpholino-thieno [3,2-d]pyrimidine, M.P. 109–110° C. (recrystallized from methanol), from 2-chloro-4-morpholino-thieno [3,2-d]pyrimidine and 2-methyl-morpholine.

(j) 2 - (2' - methyl-morpholino)-4-pyrrolidino-thieno [3,2-d]pyrimidine, M.P. 161–163° C. (recrystallized from methanol), from 2-chloro-4-pyrrolidino-thieno [3,2-d]pyrimidine and 2-methyl-morpholine.

(k) 2 - piperidino-4-diethanolamino-thieno[3,2-d]pyrimidine, M.P. 85–86° C. (recrystallized from 70% methanol), from 2 - chloro - 4 - diethanolamino-thieno [3,2-d]pyrimidine and piperidine.

(l) 2-piperidino - 4 - (N-methyl-ethanolamino)-thieno [3,2-d]pyrimidine, M.P. 93–94° C. (recrystallized from ether), from 2-chloro-4-(N-methyl-ethanolamino)-thieno-[3,2-d]pyrimidine and piperidine.

(m) 2 - pyrrolidino-4-morpholino-thieno[3,2-d]pyrimidine, M.P. 118–119° C. (recrystallized from ethanol), from 2-chloro-4-morpholino-thieno[3,2-d]pyrimidine and pyrrolidine.

(n) 2-pyrrolidino - 4 - dimethylamino-thieno[3,2-d]pyrimidine, M.P. 141–142° C. (recrystallized from methanol), from 2-chloro-4-dimethylamino-thieno[3,2-d]pyrimidine and pyrrolidine.

(o) 2-(N-methyl-ethanolamino) - 4 - piperidino-thieno [3,2-d]pyrimidine, M.P. 74–75° C. (recrystallized from ether), from 2 - chloro-4-piperidino-thieno[3,2-d]pyrimidine and N-methyl-ethanolamine.

(p) 2-morpholino - 4 - amino-thieno[3,2-d]pyrimidine, M.P. 183–184° C. (recrystallized from ethanol) from 2-chloro-4-amino-thieno[3,2-d]pyrimidine and morpholine.

(q) 2-piperidino - 4 - morpholino-thieno[3,2-d]pyrimidine, M.P. 108–109° C. (recrystallized from methanol), from 2-chloro-4-morpholino-thieno[3,2-d]pyrimidine and piperidine.

(r) 2-piperidino - 4 - isopropylamino-thieno[3,2-d]pyrimidine, M.P. 101–103° C. (recrystallized from ethanol), from 2-chloro - 4 - isopropylamino-thieno[3,2-d]pyrimidine and piperidine.

(s) 2-(N' - methyl - piperazino)-4-morpholino-thieno- [3,2-d]pyrimidine, M.P. 120–121° C. (recrystallized from ether), from 2-chloro-4-morpholino-thieno[3,2-d]pyrimidine and N-methyl-piperazine.

(t) 2-(N' - methyl - piperazino)-4-pyrrolidino-thieno- [3,2-d]pyrimidine, M.P. 175–176° C. (recrystallized from acetone), from 2-chloro - 4 - pyrrolidino-thieno[3,2-d]pyrimidine and N-methyl-piperazine.

(u) 2-(N' - methyl-piperazino)-4-amino-thieno[3,2-d] pyrimidine, M.P. 194–195° C. (recrystallized from acetone), from 2-chloro - 4 - amino-thieno[3,2-d]pyrimidine and N-methyl-piperazine.

(v) 2-(N' - methyl-piperazino)-4-n-butylamino-thieno- [3,2-d]pyrimidine, M.P. 92–94° C. (recrystallized from gasoline), from 2-chloro-4-n-butylamino-thieno[3,2-d]pyrimidine and N-methyl-piperazine.

(w) 2-(N' - methyl - piperazino)-4-ethylamino-thieno- [3,2-d]pyrimidine, M.P. 100–102° C. (recrystallized from ether), from 2-chloro-4-ethylamino-thieno[3,2-d]pyrimidine and N-methyl-piperazine.

(x) 2-(N' - methyl - piperazino)-4-n-propylamino-thieno[3,2-d]pyrimidine, M.P. 113–114° C. (recrystallized from hexane), from 2-chloro-4-n-propylamino-thieno[3,2-d]pyrimidine and N-methyl-piperazine.

(y) 2-(N' - methyl - piperazino)-4-allylamino-thieno- [3,2-d]pyrimidine, M.P. 105–106° C. (recrystallized from hexane), from 2-chloro-4-allylamino-thieno[3,2-d]pyrimidine and N-methyl-piperazine.

(z) 2-(N' - methyl-piperazino)-4-isobutylamino-thieno- [3,2-d]pyrimidine, M.P. 133–134° C. (recrystallized from hexane), from 2-chloro-4-isobutylamino-thieno[3,2-d]pyrimidine and N-methyl-piperazine.

(aa) 2-(N' - methyl - piperazino)-4-isoamylamino-thieno[3,2-d]pyrimidine, M.P. 124–125° C. (recrystallized from hexane), from 2-chloro - 4 - isoamylamino-thieno[3,2-d]pyrimidine and N-methyl-piperazine.

(ab) 2-pyrrolidino - 4 - amino-thieno[3,2-d]pyrimidine, M.P. 250–252° C. (recrystallized from ethanol), from 2-chloro-4-amino-thieno[3,2-d]pyrimidine and pyrrolidine.

(ac) 2 - ethylamino-4-pyrrolidino-thieno[3,2-d]pyrimidine, M.P. 173–174° C. (recrystallized from ethanol), from 2-chloro - 4 - pyrrolidino-thieno[3,2-d]pyrimidine and ethylamine.

(ad) 2-n-propylamino - 4 - morpholino-thieno[3,2-d] pyrimidine, M.P. 106–107° C. (recrystallized from ether), from 2-chloro - 4 - morpholino-thieno[3,2-d]pyrimidine and n-propylamine.

(ae) 2-n-propylamino-4-pyrrolidino - thieno[3,2-d]pyrimidine, M.P. 131–132° C. (recrystallized from acetone), from 2-chloro-4-pyrrolidino-thieno[3,2-d]pyrimidine and n-propylamine.

(af) 2-n-propylamino - 4-isopropylamino-thieno[3,2-d]pyrimidine M.P. 108–110° C. (recrystallized from petroleum ether), from 2-chloro-4-isopropylamino-thieno[3,2-d]pyrimidine and n-propylamine.

(ag) 2-n-butylamino - 4 - morpholino-thieno[3,2-d]pyrimidine, M.P. 112–114° C. (recrystallized from methanol), from 2-chloro - 4 - morpholino-thieno[3,2-d]pyrimidine and n-butylamine.

(ah) 2-n-butylamino - 4 - pyrrolidino-thieno[3,2-d]pyrimidine, M.P. 124–125° C. (recrystallized from acetone), from 2-chloro - 4 - pyrrolidino-thieno[3,2-d]pyrimidine and n-butylamine.

(ai) 2-n-butylamino - 4 - amino-thieno[3,2-d]pyrimidine, M.P. 101–103° C. (recrystallized from benzene), from 2-chloro - 4 - amino-thieno[3,2-d]pyrimidine and n-butylamine.

(aj) 2-isopropylamino - 4 - morpholino-thieno[3,2-d]pyrimidine, M.P. 131–133° C. (recrystallized from ether), from 2-chloro - 4 - morpholino-thieno[3,2-d]pyrimidine and isopropylamine.

(ak) 2-isopropylamino - 4 - pyrrolidino-thieno[3,2-d]pyrimidine, M.P. 123–124° C. (recrystallized from ethanol), from 2-chloro-4-pyrrolidino-thieno[3,2-d]pyrimidine and isopropylamine.

(al) 2-isopropylamino - 4 - amino-thieno[3,2-d]pyrimidine, M.P. 138–139° C. (recrystallized from benzene), from 2-chloro-4-amino-thieno[3,2-d]pyrimidine and isopropylamine.

(am) 2-isobutylamino - 4 - morpholino-thieno[3,2-d]pyrimidine, M.P. 93–94° C. (recrystallized from ether), from 2-chloro-4-morpholino-thieno[3,2-d]pyrimidine and isobutylamine.

(an) 2-isobutylamino - 4 - pyrrolidino-thieno[3,2-d]pyrimidine, M.P. 133–134° C. (recrystallized from acetone), from 2-chloro-4-pyrrolidino-thieno[3,2-d]pyrimidine and isobutylamine.

(ao) 2-isobutylamino - 4 - amino-thieno[3,2-d]pyrimidine, M.P. 132–134° C. (recrystallized from benzene), from 2-chloro-4-amino-thieno[3,2-d]pyrimidine and isobutylamine.

(ap) 2-isoamylamino - 4-morpholino-thieno[3,2-d]pyrimidine, M.P. 89–90° C. (recrystallized from ether), from 2-chloro - 4 - morpholino-thieno[3,2-d]pyrimidine and isoamylamine.

(aq) 2-isoamylamino - 4 - pyrrolidino - thieno[3,2-d]pyrimidine, M.P. 117–119° C. (recrystallized from acetone), from 2-chloro-4-pyrrolidino-thieno[3,2-d]pyrimidine and isoamylamine.

(ar) 2-isoamylamino - 4 - amino-thieno[3,2-d]pyrimidine, M.P. 109–111° C. (recrystallized from acetone), from 2-chloro-4-amino-thieno[3,2-d]pyrimidine and isoamylamine.

(as) 2-allylamino - 4 - isopropylamino - thieno[3,2-d]pyrimidine, M.P. 103–105° C. (recrystallized for gasoline), from 2-chloro-4-isopropylamino-thieno[3,2-d]pyrimidine and allylamine.

(at) 2-dimethylamino - 4 - morpholino - thieno[3,2-d]pyrimidine, M.P. 103–104° C. (recrystallized from ether), from 2-chloro-4-morpholino-thieno[3,2-d]pyrimidine and dimethylamine.

(au) 2-dimethylamino - 4 - pyrrolidino - thieno[3,2-d]pyrimidine, M.P. 171–172° C. (recrystallized from acetone), from 2-chloro-4-pyrrolidino-thieno[3,2-d]pyrimidine and dimethylamine.

(av) 2-dimethylamino - 4 - amino-thieno[3,2-d]pyrimidine, M.P. 174–175° C. (recrystallized from methanol), from 2-chloro-4-amino-thieno[3,2-d]pyrimidine and dimethylamine.

(aw) 2-diethylamino - 4 - morpholino - thieno[3,2-d]pyrimidine, M.P. 62–63° C. (recrystallized from ethanol), from 2-chloro-4-morpholino-thieno[3,2-d]pyrimidine and diethylamine.

(ax) 2-diethylamino - 4 - pyrrolidino - thieno[3,2-d]pyrimidine, M.P. 105–107° C. (recrystallized from methanol), from 2-chloro-4-pyrrolidino-thieno[3,2-d]pyrimidine and diethylamine.

(ay) 2-diethylamino- 4 - isopropylamino-thieno[3,2-d]pyrimidine, M.P. 110–111° C. (recrystallized from petroleum ether), from 2-chloro - 4 - isopropylamino-thieno-[3,2-d]pyrimidine and diethylamine.

(az) 2-diethylamino - 4 - ethanolamino - thieno[3,2-d]pyrimidine, M.P. 99–100° C. (recrystallized from methanol), from 2-chloro-4-ethanolamino-thieno[3,2-d]pyrimidine and diethylamine.

(ba) 2-ethanolamino - 4 - morpholino - thieno[3,2-d]pyrimidine, M.P. 122–123° C. (recrystallized from acetone), from 2-chloro-4-morpholino-thieno[3,2-d]pyrimidine and ethanolamine.

(bb) 2-diethanolamino - 4 - morpholino-thieno[3,2-d]pyrimidine, M.P. 118–119° C. (recrystallized from methanol), from 2-chloro-4-morpholino-thieno[3,2-d]pyrimidine and diethanolamine.

(bc) 2-diethanolamino - 4 - pyrrolidino - thieno[3,2-d]pyrimidine, M.P. 141–142° C. (recrystallized from acetone), from 2-chloro-4-pyrrolidino-thieno[3,2-d]pyrimidine and diethanolamine.

(bd) 2-diethanolamino - 4 - isopropylamino - thieno[3,2-d]pyrimidine, M.P. 97–99° C. (recrystallized from methanol), from 2-chloro-4-isopropylamino-thieno[3,2-d]pyrimidine and diethanolamine.

(be) 2-(N - methyl - ethanolamino) - 4 - morpholino-thieno[3,2-d]pyrimidine, M.P. 90–92° C. (recrystallized from a mixture of ether and methanol), from 2-chloro-4 - morpholino - thieno[3,2-d]pyrimidine and N-methylethanolamine.

(bf) 2-(N - methyl - ethanolamino) - 4 - pyrrolidino-thieno[3,2-d]pyrimidine, M.P. 101–102° C. (recrystallized from ethyl acetate), from 2-chloro-4-pyrrolidino-thieno[3,2-d]pyrimidine and N-methyl-ethanolamine.

(bg) 2-(N-methyl-ethanolamine) - 4 - isopropylamino-thieno[3,2-d]pyrimidine, M.P. 99–100° C. (recrystallized from acetone), from 2-chloro-4-isopropylamino-thieno[3,2-d]pyrimidine and N-methyl-ethanolamine.

(bh) 2-ethylamino - 4 - morpholino - thieno[3,2-d]pyrimidine, M.P. 104–106° C. (recrystallized from hexane), from 2-chloro-4-morpholino-thieno[3,2-d]pyrimidine and ethylamine.

(bi) 2-ethylamino - 4 - allylamino-thieno[3,2-d]pyrimidine-hydrochloride, M.P. 230–232° C. (recrystallized from ethanol), from 2-chloro-4-allylamino-thieno[3,2-d]pyrimidine and ethylamine and precipitation of the salt with hydrogen chloride in ethereal solution.

Example 3.—Preparation of 2,4-diethoxy-thieno[3,2-d]pyrimidine

A solution of 1.0 gm. (0.044 gm.-atoms) of sodium in 50 cc. of absolute ethanol was added dropwise at 50° C. to a solution of 4.1 gm. (0.02 mol) of 2,4-dichloro-thieno[3,2-d]pyrimidine in 100 cc. of absolute ethanol, accompanied by stirring, and the resulting mixture was then refluxed for one hour. The precipitated sodium chloride was separated by vacuum filtration, and the filtrate was concentrated by evaporation. A crystalline substance separated out, which was isolated by vacuum filtration, thoroughly washed with water, and recrystallized from ethanol. 3.7 gm. (83% of theory) of a compound having a melting point of 107–108° C., were obtained. It was identified to be 2,4-diethoxy-thieno[3,2-d]pyrimidine of the formula

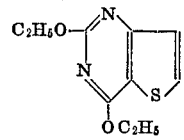

Analysis.—$C_{10}H_{12}N_2O_2S$; mol. wt. 224.29. Calculated: C, 53.55%; H, 5.39%; N, 12.49%. Found: C, 53.70%; H, 5.48%; N, 12.32%.

Using a procedure analogous to that described above, the following additional 2,4-di-lower alkoxy-substituted thieno[3,2-d]pyrimidines were prepared:

(a) 2,4-dimethoxy-thieno[3,2-d]pyrimidine, M.P. 120–121° C. (recrystallized from methanol), from 2,4-dichloro-thieno[3,2-d]pyrimidine and sodium methylate.

(b) 2,4-di-isopropoxy-thieno[3,2-d]pyrimidine, M.P. 62–63° C. (recrystallized from acetone), from 2,4-dichloro-thieno[3,2-d]pyrimidine and sodium isopropylate.

(c) 2,4-di-(n-butoxy)-thieno[3,2-d]pyrimidine, M.P. 47–49° C. (recrystallized from methanol), from 2,4-dichloro-thieno[3,2-d]pyrimidine and sodium n-butylate.

Example 4.—Preparation of 2-ethoxy-4-(2'-methylmorpholino)-thieno[3,2-d]pyrimidine A mixture of 5.4 gm. (0.02 mol) of 2-chloro-4-(2'-methyl-morpholino)-thieno[3,2-d]pyrimidine and a solution of 0.7 gm. (0.03 gm.-atoms) of sodium in 150 cc. of absolute ethanol was refluxed for eight hours. Thereafter, the reaction solution was evaporated in vacuo, and the crystalline residue was thoroughly washed with water and recrystallized from aqueous 70% ethanol. 3.2 gm. (57% of theory) of a compound having a melting point of 100–101° C. were obtained. It was identified to be 2-ethoxy - 4 - (2' - methyl - morpholino) - thieno[3,2-d]pyrimidine of the formula

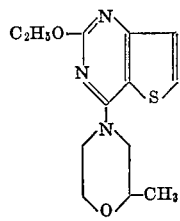

Analysis.—$C_{13}H_{17}N_3O_2S$; mol. wt. 279.37. Calculated: C, 55.88%; H, 6.13%; S, 11.47%. Found: C, 56.00%; H, 6.17%; S, 11.35%.

Using a procedure analogous to that described above, the following additional 2-(substituted hydroxy)-4-basic-substituted thieno[3,2-d]pyrimidines were prepared:

(a) 2-methoxy-4-morpholino-thieno[3,2-d]pyrimidine, M.P. 126–128° C. (recrystallized from ethanol), from 2-chloro-4-morpholino-thieno[3,2-d]pyrimidine and sodium methylate.

(b) 2 - methoxy - 4 - (2' - methyl - morpholino)-thieno[3,2-d]pyrimidine, M.P. 82–84° C. (recrystallized from petroleum ether), from 2-chloro-4-(2'-methyl-morpholino-thieno[3,2-d]pyrimidine and sodium methylate.

(c) 2 - methoxy - 4 - pyrrolidino - thieno[3,2-d]pyrimidine, M.P. 147–149° C. (recrystallized from acetone), from 2 - chloro - 4 - pyrrolidino - thieno[3,2-d]pyrimidine and sodium methylate.

(d) 2-methoxy-4-amino-thieno[3,2-d]pyrimidine, M.P. 219–221° C. (recrystallized from ethanol), from 2-chloro - 4 - amino - thieno[3,2-d]pyrimidine and sodium methylate.

(e) 2 - ethoxy - 4 - morpholino - thieno[3,2-d]pyrimidine, M.P. 109–111° C. (recrystallized from ethanol), from 2-chloro-4-morpholino-thieno[3,2-d]pyrimidine and sodium ethylate.

(f) 2 - ethoxy - 4 - pyrrolidino - thieno[3,2-d]pyrimidine, M.P. 145–146° C. (recrystallized from acetone), from 2 - chloro - 4 - pyrrolidino - thieno[3,2-d]pyrimidine and sodium ethylate.

(g) 2-ethoxy-4-amino-thieno[3,2-d]pyrimidine, M.P. 160–162° C. (recrystallized from acetone), from 2-chloro-4-amino-thieno[3,2-d]pyrimidine and sodium ethylate.

(h) 2 - n - propoxy - 4-amino-thieno[3,2-d]pyrimidine, M.P. 131–133° C. (recrystallized from methanol), from 2-chloro-4-amino-thieno[3,2-d]pyrimidine and sodium n-propylate.

(i) 2 - n - butoxy - 4 - (2' - methyl - morpholino)-thieno[3,2-d]pyrimidine, M.P. 42–44° C. (recrystallized from petroleum ether), from 2-chloro-4-(2'-methyl-morpholino)-thieno[3,2-d]pyrimidine and sodium n-butylate.

(j) 2 - isopropoxy - 4 - morpholino - thieno[3,2-d]pyrimidine, M.P. 102–104° C. (recrystallized from ether), from 2-chloro-4-morpholino-thieno[3,2-d]pyrimidine and sodium isopropylate.

(k) 2 - isopropoxy - 4 - pyrrolidino - thieno[3,2-d]pyrimidine, M.P. 141–142° C. (recrystallized from acetone), from 2-chloro-4-pyrrolidino-thieno[3.2-d]pyrimidine and sodium isopropylate.

(l) 2 - isopropoxy - 4 - isopropylamino - thieno[3,2-d]pyrimidine, M.P. 141–142° C. (recrystallized from petroleum ether), from 2 - chloro - 4 - isopropylamino-thieno[3,2-d]pyrimidine and sodium isopropylate.

Example 5.—Preparation of 2-morpholino-4-ethoxy-thieno[3,2-d]pyrimidine

A mixture of 4.3 gm. (0.02 mol) of 2-chloro-4-ethoxy-thieno[3,2-d]pyrimidine and 10 cc. of morpholine was heated at 100° C. for four hours. Thereafter, the reaction solution was poured into water, whereupon an oily substance separated out which crystallized after a short period of time. The crystalline precipitate was separated by vacuum filtration, washed with water and recrystallized from methanol. 3.9 gm. (74% of theory) of a compound having a melting point of 105–106° C. were obtained. It was identified to be 2-morpholino-4-ethoxy-thieno[3,2-d]pyrimidine of the formula

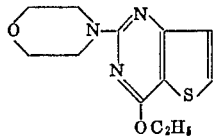

Analysis.—$C_{12}H_{15}N_3O_2S$; mol. wt. 265.34. Calculated: C, 54.32%; H, 5.70%; S, 12.09%. Found: C, 54.45%; H, 5.80%; S, 12.21%.

Using a procedure analogous to that described above, the following additional 2-basic-4-lower alkoxy-substituted thieno[3,2-d]pyrimidine was prepared:

(a) 2 - (N' - methyl - ethanolamino) - 4 - ethoxy-thieno[3,2-d]pyrimidine, M.P. 85–86° C. (recrystallized from ether), from 2-chloro-4-ethoxy-thieno[3,2-d]pyrimidine and N-methylethanolamine.

Example 6.—Preparation of 2-(N'-methyl-piperazino)-4-isopropylamino - thieno[3,2-d]pyrimidine dihydrochloride 1.45 gm. (0.005 mol) of 2-(N'-methyl-piperazino)-4-isopropylamino-thieno[3,2-d]pyrimidine were dissolved in 50 cc. of absolute ether, and the resulting solution was admixed with ethereal hydrochloric acid until it was acid to Congo red. The precipitate formed thereby was separated by vacuum filtration, washed with absolute ether, and recrystallized from absolute ethanol. 1.6 gm. (88% of theory) of compound having a melting point of 285° C. (decomposition) were obtained. The product was identified to be the dihydrochloride of 2-(N'-methyl-piperazino)-4-isopropylamino-thieno[3,2-d]pyrimidine.

Analysis.—$C_{14}H_{23}Cl_2N_5S$; mol wt. 364.35. Calculated: C, 46.15%; H, 6.36%; S, 8.80%. Found: C, 45.90%; H, 6.40%; S, 8.83%.

In analogous fashion the following mono- and dihydrochlorides of basic-substituted thieno[3,2-d]pyrimidines were prepared from the corresponding free base and ethereal hydrochloric acid.

(a) 2 - (N'-methyl-piperazino)-4-ethoxy-thieno[3,2-d]pyrimidine hydrochloride, M.P. 289–290° C. (recrystallized from ethanol).

(b) 2,4 - di-(ethylamino)-thieno[3,2-d]pyrimidine hydrochloride, M.P. 228–230° C. (recrystallized from a mixture of ethanol and ethylacetate).

(c) 2,4 - di - (isoamylamino)-thieno[3,2-d]pyrimidine hydrochloride, M.P. 177–178° C. (recrystallized from acetone).

(d) 2 - n - amylamino - 4 - morpholino-thieno[3,2-d]pyrimidine hydrochloride, M.P. 185–187° C. (recrystallized from methyl ethyl ketone).

(e) 2 - (N' - methyl - piperazino)-4-(2'-methyl-morpholino)-thieno[3,2-d]pyrimidine dihydrochloride, M.P. 260–261° C. (recrystallized from a mixture of ethanol and ethylacetate).

(f) 2 - (N' - methyl-piperazino)-4-piperidino-thieno[3,2-d]pyrimidine dihydrochloride, M.P. 280° C. (decomposition) (recrystallized from ethanol).

(g) 2 - n - propylamino - 4-(2'-methyl-morpholino)-thieno[3,2-d]pyrimidine hydrochloride, M.P. 205–207° C. (recrystallized from methyl ethyl ketone).

(h) 2 - isoamylamino - 4(2'-methyl-morpholino)thieno[3,2-d]pyrimidine hydrochloride, M.P. 184–186° C. (recrystallized from methyl ethyl ketone).

Example 7.—Preparation of 2-morpholino-4-pyrrolidino-thieno[3,2-d]pyrimidine

A mixture of 2.55 gm. (0.01 mol) of 2-morpholino-4-chloro-thieno[3,2-d]pyrimidine and 15 cc. of pyrrolidine was refluxed for thirty minutes. Thereafter, the reaction mixture was allowed to cool, and the crystalline precipitate was separated by vacuum filtration, washed with ethanol and recrystallized from ethanol. 2.1 gm. (72% of theory) of a compound having a melting point of 174–176° C. obtained. It was identified to be 2-morpholino-4-pyrrolidino-thieno[3,2-d]pyrimidine of the formula

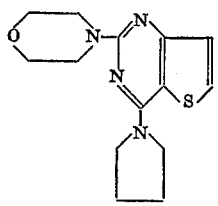

*Analysis.*—$C_{14}H_{18}N_4OS$; mol wt. 290.39. Calculated: C, 57.90%; H, 6.25%; N, 19.30%. Found: C, 57.85%; H, 6.30%; N, 19.37%.

All of the compounds prepared in Examples 1 and 2 may also be synthesized in a manner analogous to that described above.

The compounds according to the present invention, that is, those embraced by Formula I and their non-toxic, pharmacologically acceptable acid addition salts have useful pharmacodynamic properties. More particularly, they exhibit cardiovascular activities in warm-blooded animals, that is, they dilate the coronaries and peripheral blood vessels; those compounds comprising a N-methyl-piperazino substituent in the 2- or 4-position are particularly effective in this respect. However, the compounds of the present invention also exhibit sedative activities in warm-blooded animals and inhibit the aggregation of platelets in blood plasma of warm-blooded animals. Those compounds comprising a 2-alkoxy substituent are particularly effective as sedatives.

A representative number of compounds according to the present invention were pharmacologically tested for cardiovascular activity on dogs, for inhibition of platelet-aggregation in human plasma, and for sedative activity and acute toxicity on male laboratory mice of the NMRI-strain having an average body weight of 20 gm.

Acute toxicity.—Various doses of each of the compounds were administered intraperitoneally to male laboratory mice, the number of animals which perished within 24 hours was observed and the median lethal dose ($LD_{50}$) was calculated according to the method of Litchfield and Wilcoxon [J. Pharmacol. exper. Therap. 96, 99 (1949)]. The results of this test are shown together with the results of the cardiovascular activity and platelet-aggregation inhibiting activity in the following tables.

Inhibition of platelet-aggregation in human plasma.—According to the method described by K. Breddin, Schweiz. Med. Wschr. 95, 655–660 (1965), human blood plasma rich in platelets is, after the addition of the compound under investigation, slowly rotated in a water bath.

A siliconized glass holder is subsequently covered with the rotated plasma, washed, fixed and colored. The inhibition of the aggregation of the platelets is determined microscopically. The following substances show a good inhibition of the aggregation of platelets still at a concentration of $10^{-4}$ mols per liter:

Cardiovascular activity.—The coronary and femoral blood flow was measured before and after administration of the compound under investigation on dogs under chloralose-urethane anesthesia. After thoractomy, the descending branch of the left coronary artery was cannulized and connected to the arteria carotis. The blood flow rate was measured by means of an electromagnetic flow meter. At the same time the femoral blood flow rate was measured by means of a rotameter. The compound under investigation was administered intravenously, and its cardiovascular activity was expressed as a multiple of the analogous activity of papaverine. The following table shows the results of this test:

| Substance Thieno[3,2-d]pyrimidine of the Formula I | | Cardiovascular activity in relation to papaverine (P) | | $LD_{50}$ i.p., mg./kg. mouse |
|---|---|---|---|---|
| $R_1$ | $R_2$ | Coronary dilating activity | Increase in peripheral blood flow | |
| Morpholino | Morpholino | P | 3.5×P | ~500 |
| Diethanolamino | Piperidino | None | 2×P | ~600 |
| Morpholino | N-methylethanolamino | 2×P | P | 450 |
| Pyrrolidino | Dimethylamino | P | 2×P | ~400 |
| N-methylpiperazino | Amino | None | 6×P | 300 |
| Do | Butylamino | None | 20×P | ~300 |
| Do | n-Propylamino | None | 35×P | ~200 |
| Isoamylamino | Morpholino | 0.5×P | 7×P | ~550 |
| n-Propylamino | Isopropylamino | 7×P | 0.5×P | ~150 |
| n-Butylamino | Morpholino | 3×P | 1×P | ~500 |
| Allylamino | Isopropylamino | 6×P | 0.5×P | ~200 |
| Methoxy | Morpholino | 7×P | 2×P | ~500 |
| Ethylamino | Allylamino | None | 9.5×P | ~300 |
| Diethylamino | Ethanolamino | 1×P | 6×P | ~150 |
| Do | Pyrrolidino | None | 2.5×P | ~400 |
| Do | Isopropylamino | None | 10×P | ~250 |
| N-methylethanolamino | Piperidino | 1×P | 3.5×P | ~300 |
| N-methylpiperazino | Ethoxy | None | 2.5×P | ~400 |
| Papaverin | | | | 750 |

Sedative activity.—The compound under investigation was administered by the intraperitoneal route at dosages of 50 to 600 mgm./kg. to a group of six adult laboratory mice, and the behavior of the animals was observed over a period of several hours, especially with respect to their reaction to the release of various reflexes. Based on these observations, the effective sedative strength of each compound was grouped in one of the following three classes of sedative effectiveness:

(a) moderate +
(b) good ++
(c) very good +++

The following table shows the results of this test:

| Substance—Thienol[3,2-d] pyrimidine of the Formula I | | Sedative Activity |
|---|---|---|
| $R_1$ | $R_2$ | |
| Morpholino | Morpholino | +++ |
| Diethanolamino | Piperidino | + |
| Morpholino | N-methyl-ethanolamino | ++ |
| N-methyl-piperazino | n-Butylamino | ++ |
| Do | n-Propylamino | + |
| Isoamylamino | Morpholino | + |
| Methoxy | ____do____ | ++ |
| n-Butylamino | ____do____ | + |
| Diethylamino | ____do____ | ++ |

For therapeutic purposes the compounds according to the present invention may be administered to warm-blooded animals orally or parenterally, preferably as active ingredients in customary dosage unit compositions, that is, compositions in dosage unit form consisting essentially of an inert carrier and uniformly distributed therethrough one dosage unit of the active ingredient, such as tablets, coated pills, suppositories, hypodermic solutions, capsules, syrups, drop solutions for oral administration and the like. One effective dosage unit of the compounds according to the present invention is from 0.166 to 4.2 mgm./kg., preferably 1.67 mgm./kg.

The following examples illustrate a few dosage unit compositions comprising a compound of the present invention as an active ingredient and represent the best mode contemplated of putting the invention to practical use. The parts are parts by weight unless otherwise specified.

Example 8.—Tablets

The tablet composition was compounded from the following ingredients:

|  | Parts |
|---|---|
| 2 - methoxy - 4 - morpholino - thieno[3,2 - d]pyrimidine | 100.0 |
| Corn starch | 45.0 |
| Secondary calciumphosphate | 77.0 |
| Polyvinylpyrrolidone | 6.0 |
| Magnesium stearate | 2.0 |
| Total | 230.0 |

Compounding procedure.—The thienopyrimidine compound, the corn starch and the calcium phosphate were homogeneously admixed with each other, and the mixture was moistened with an aqueous 15% solution of the polyvinylpyrrolidone. The moist mixture was forced through a 1.5 mm.-mesh screen, and the granulate thus obtained was dried at 40° C. The dry granulate was again passed through the screen, was admixed with the magnesium stearate, and the mixture was pressed into 230 mgm.-tablets. Each tablet contained 100 mgm. of the active ingredient and, when administered perorally to a warm-blooded animal of about 60 kg. body weight in need of such treatment, produced very good coronary and peripheral blood vessel dilating effects.

Example 9.—Coated pills

The pill core composition was compounded from the following ingredients:

|  | Parts |
|---|---|
| 2 - n - propylamino - 4 - isopropylamino-thieno[3,2-d]pyrimidine | 25.0 |
| Secondary calciumphosphate | 75.0 |
| Corn starch | 21.0 |
| Gelatin | 4.0 |
| Talcum | 4.0 |
| Magnesium stearate | 1.0 |
| Total | 130.0 |

Compounding procedure.—The thienopyrimidine compound, the calcium phosphate and the corn starch were homogeneously admixed with each other, and the resulting mixture was moistened with an aqueous 14% solution of the gelatin. The moist mixture was forced through a 1.5 mm.-mesh screen, and the moist granulate thus obtained was dried at 40° C. The dry granulate was forced through a 1.0 mm.-mesh screen and was then uniformly admixed with the talcum and the magnesium stearate. The mixture was pressed into 130 mgm.-pill cores, which were then coated with a thin shell consisting essentially of talcum and sugar. The finished pills were then polished with bees-wax. Each coated pill weighed about 200 mgm. and contained 25 mgm. of the active ingredient and, when administered perorally to a warm-blooded animal of about 60 kg. body weight in need of such treatment, produced very good coronary and peripheral blood vessel dilating effects.

Example 10.—Rectal suppositories

The suppository composition was compounded from the following ingredients:

|  | Parts |
|---|---|
| 2,4-dimorpholino-thieno[3,2-d]pyrimidine | 200.0 |
| Cocoa butter | 1550.0 |
| Total | 1750.0 |

Compounding procedure.—The cocoa butter was melted and then cooled to 37° C., whereupon the finely powdered thienopyrimidine compound was stirred in, and the mixture was then homogenized and poured into cooled suppository molds, each holding 1750 mgm. of the mixture. Each suppository contained 200 mgm. of the active ingredient and, when administered by the rectal route to a warm-blooded animal of about 60 kg. body weight in need of such treatment, produced very good coronary and peripheral blood vessel dilating effects.

Example 11.—Hypodermic solution

The solution was compounded from the following ingredients:

|  | Parts |
|---|---|
| 2 - (N'-methyl-piperazino) - 4 - isobutylamino-thieno[3,2-d]pyrimidine | 10.0 |
| Tartaric acid | 20.0 |

Double distilled water, q.s. ad, 2000.0 parts by volume.

Compounding procedure.—The tartaric acid and then the thieno[3,2-d]pyrimidine compound were dissolved in about one-fourth of the required amount of distilled water under exclusion of light and in an atmosphere of nitrogen. The solution was then diluted with the remaining distilled water to the required volume and was filtered until free from suspended particles. The finished solution was filled into brown 2 cc.-ampules in and atmosphere of nitrogen, which were subsequently sterilized for thirty minutes at 100° C. and sealed. Each ampule contained 10 mgm. of the active ingredient, and when the contents thereof were administered intravenously to a warm-blooded animal of about 60 kg. body weight in need of such treatment, very good coronary and peripheral blood vessel dilating effects were obtained.

Example 12.—Drop solution for oral administration

The solution was compounded from the following ingredients:

|  | Parts |
|---|---|
| 2 - (N' - methyl - piperazino) - 4 - isobutylamino thieno[3,2-d]pyrimidine | 10.0 |
| Tartaric acid | 10.0 |
| Cane sugar | 350.0 |
| Sorbic acid | 1.0 |
| Essence of cocoa | 50.0 |

Ethanol, 200.0 parts by volume.
Polyethyleneglycol 600, 100.0 parts by volume.
Distilled water, q.s. ad, 1000.0 parts by volume.

Compounding procedure.—The sorbic acid was dissolved in the ethanol, and an equal volume of distilled water was added. The tartaric acid and the thienopyrimidine compound were dissolved in the resulting aqueous alcoholic solution while stirring (Solution A). The cane sugar was dissolved in the remaining amount of distilled water (Solution B). Solution B, the polyethyleneglycol and the essence of cocoa were added to Solution A while stirring, and the finished solution was filtered. The drop solution was then filled into brown bottles of convenient size. Each cc. of solution (20 drops) contained 10 mgm. of the thienopyrimidine compound. All of the above steps of the compounding procedure must be carried out under exclusion of light and in an atmosphere of nitrogen, and the filled bottles must be stored in a dark place. When 20 drops of the solution were administered perorally to a warm-blooded animal of about 60 kg. body weight in need of such treatment, very good coronary and peripheral blood vessel dilating effects were obtained.

Example 13.—Gelatin capsules

The capsule filler was compounded from the following ingredients:

| | Parts |
|---|---|
| 2-isoamylamino - 4 - morpholino - thieno[3,2-d]pyrimidine | 20.0 |
| Lactose | 60.0 |
| Talcum | 20.0 |
| Total | 100.0 |

Compounding procedure.—The individual ingredients were intimately admixed with each other, the mixture was passed through a 1.0 mm.-mesh screen, and 100 mgm.-portions of the screened mixture were filled into gelatin capsules of suitable size. Each capsule contained 20 mgm. of the thienopyrimidine compound and, when administered perorally to a warm-blooded animal of about 60 kg. body weight in need of such treatment, produced very good coronary and peripheral blood vessel dilating effects.

Although the above dosage unit composition examples illustrate the use of only a few species of the broad class of compounds according to the present invention as active ingredients, it should be understood that any other compound embraced by Formula I or a non-toxic acid addition salt thereof may be substituted for the particular species used in Examples 8 through 13. Similarly, the amounts of active ingredient given in those examples may be varied within the dosage unit limitations indicated above, as may the nature and amounts of the inert ingredients, to meet specific requirements.

We claim:
1. A compound of the formula

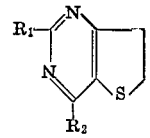

wherein $R_1$ and $R_2$ are each alkoxy of 1 to 4 carbon atoms, amino, alkyl of 1 to 5 carbon atoms-amino, allylamino, (hydroxy-alkyl of 1 to 2 carbon atoms)-amino, dialkyl of 1 to 5 carbon atoms-amino, di-(hydroxy-alkyl of one to two carbon atoms)-amino, (alkyl of 1 to 5 carbon atoms)-(hydroxy-alkyl of 1 to 2 carbon atoms)-amino, piperidino, pyrrolidino, morpholino, methyl-morpholino or N-methyl-piperazino, or a non-toxic, pharmacologically acceptable acid addition salt thereof.

2. 2-isoamylamino - 4 - morpholino-thieno[3,2-d]pyrimidine.

3. 2-n-propylamino - 4 - isopropylamino-thieno[3,2-d]pyrimidine.

4. 2-methoxy - 4 - morpholino-thieno[3,2-d]pyrimidine.

5. 3-diethanolamino - 4 - morpholino - thieno[3,2-d]pyrimidine.

6. 2-ethanolamino - 4 - morpholino-thieno[3,2-d]pyrimidine.

No references cited.

ALEX MAZEL, Primary Examiner

J. TOVAR, Assistant Examiner

U.S. Cl. X.R.

260—251, 251.5; 424—248, 251

PO-1050
(5/69)

UNITED STATES PATENT OFFICE
CERTIFICATE OF CORRECTION

Patent No. 3,475,429      Dated October 28, 1969

Inventor(s) Eberhard Woitun and Gerhard Ohnacker

It is certified that error appears in the above-identified patent and that said Letters Patent are hereby corrected as shown below:

Printer's Errors:
Column 1, line 18, "theino" should read --thieno--;
        line 33, the formula should read 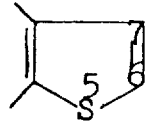

Column 3, line 55, the formula should read 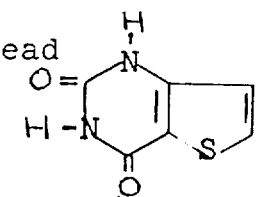

Column 4, line 11, "0.02%" should read --0.92%--;
        line 35, the formula should read 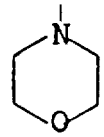

line 47, "thienol" should read --thieno--.
Column 6, line 65, "thien" should read --thieno--.
Column 7, line 13, "di-ethanolamino" should read --diethanolamin
Column 11, line 44, "ethanol" should read --methanol--;
        line 50, --)-- should be inserted after "pholino".
Column 14, line 32, after "liter:" insert

| Substance | $LD_{50}$ i.p. mg/k |
|---|---|
| 2,4-Dimorpholino-thieno[3,2-d]pyrimidine | ~500 |
| 2-Diethanolamino-4-morpholino-thieno[3,2-d]pyrimidine | ~600 |
| 2-(N-methyl-ethanolamino)-4-morpholino-thieno[3,2-d]pyrimidine | ~200 |
| 2-Ethanolamino-4-morpholino-thieno[3,2-d]pyrimidine | ~200 |
| 2-Ethylamino-4-morpholino-thieno[3,2-d]pyrimidine | ~350 |

Page 2 - Patent No. 3,475,429 issued October 28, 1969
Column 18, line 32, "3-diethanolamino" should read
--2-diethanolamino--.
Applicants' Mistakes:
Column 2, line 27, "R₁" should read --R₂--.
Column 12, line 43, "N¹-methyl" should read --N-methyl--.
Column 18, line 12, the formula should read
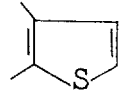
SIGNED AND
SEALED
MAY 19 1970
(SEAL)
Attest:
Edward M. Fletcher, Jr.
Attesting Officer
WILLIAM E. SCHUYLER,
Commissioner of Pate